(12) United States Patent
Stauber

(10) Patent No.: US 6,467,608 B2
(45) Date of Patent: Oct. 22, 2002

(54) CONVEYING DEVICE

(75) Inventor: H. Ulrich Stauber, Grüt (CH)

(73) Assignee: Ferag AG, Hinwil (CH)

( * ) Notice: Subject to any disclaimer, the term of this patent is extended or adjusted under 35 U.S.C. 154(b) by 101 days.

(21) Appl. No.: 09/760,079

(22) Filed: Jan. 12, 2001

(65) Prior Publication Data

US 2001/0019006 A1 Sep. 6, 2001

(51) Int. Cl.[7] ............................................. B65G 43/00
(52) U.S. Cl. ................................................. 198/460.2
(58) Field of Search ..................................... 198/460.2

(56) References Cited

U.S. PATENT DOCUMENTS

| | | | |
|---|---|---|---|
| 4,895,360 A | | 1/1990 | Reist |
| 5,547,004 A | * | 8/1996 | Fransen .................. 198/419.3 |
| 5,758,873 A | | 6/1998 | Faesser |
| 5,878,865 A | * | 3/1999 | Bailey et al. ............. 198/459.4 |

FOREIGN PATENT DOCUMENTS

| | | |
|---|---|---|
| DE | 195 10 649 A1 | 5/1996 |
| DE | WO 99/33733 | 7/1999 |
| EP | 0 827 929 A1 | 3/1998 |
| FR | 2 338 202 | 8/1977 |

* cited by examiner

Primary Examiner—Christopher P. Ellis
Assistant Examiner—Richard Ridley

(74) Attorney, Agent, or Firm—Pearne & Gordon LLP

(57) ABSTRACT

In an adjustment zone (B), the spacings between objects, which are conveyed by independently movable holding elements (2) along a rail track (1) are e.g. for a processing operation adjusted to a predefined value larger than the minimum spacing. To achieve this, a continuously circulating and compressible, adjusting chain (5) running in a circulating track is provided, which adjusting chain (5) is elongatable in a controlled manner. The circulating track extends at least in the adjustment zone (B) parallel to the rail track (1) such that the adjusting chain is in engagement with holding elements (2) conveyed along the rail track (1). Furthermore, control means for adjusting a predefined compression of the adjusting chain (5) are provided in the adjustment zone (B). The adjusting chain (5) comprises e.g. chain links (6) joined together in an articulated manner. Assigned to every second articulated joint of chain links (6) are guide rollers (7.1) rolling in a circular guideway (8) and drivers for driving holding elements (2), and assigned to the other articulated joints are control rollers (12) rolling along a cam (11) which serves as control means. The distance between the circular guideway (8) and the cam (11) determines compression of the adjusting chain (5) and therefore the spacing between the holding elements (2) in the adjustment zone (B). The device is suitable in particular for adjusting spacings between holding elements greater than the minimum spacings as established between holding elements being conveyed in a pushed manner, wherein the holding elements are pushed and the adjusting chain (5) is circulating passively.

18 Claims, 7 Drawing Sheets

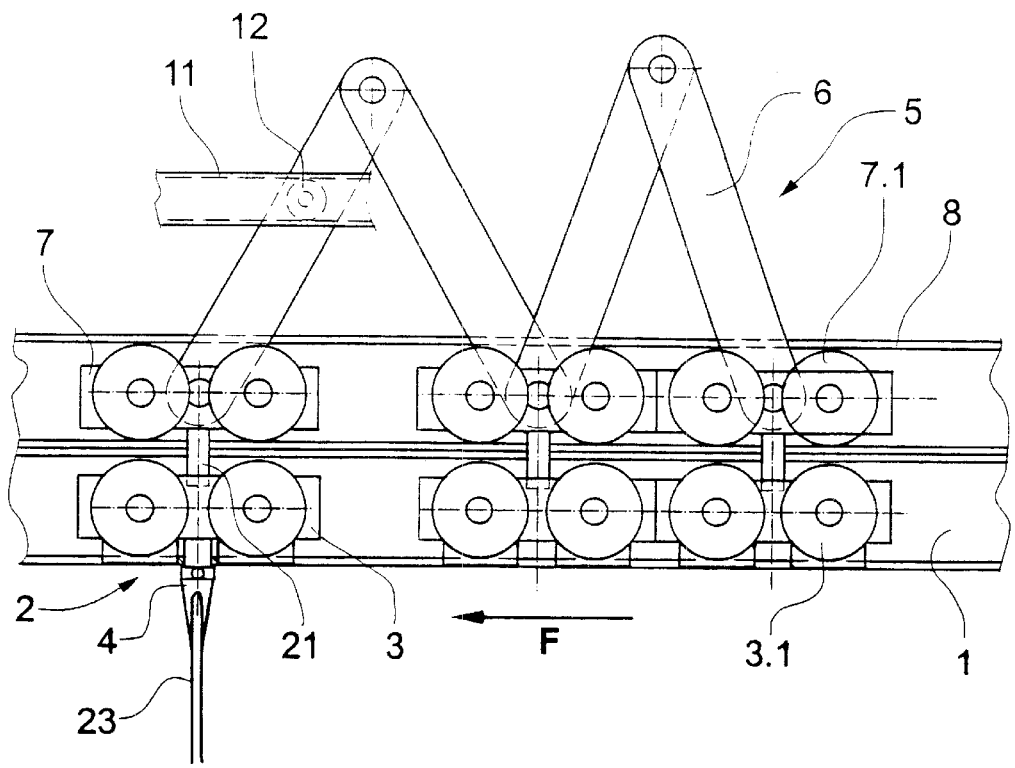
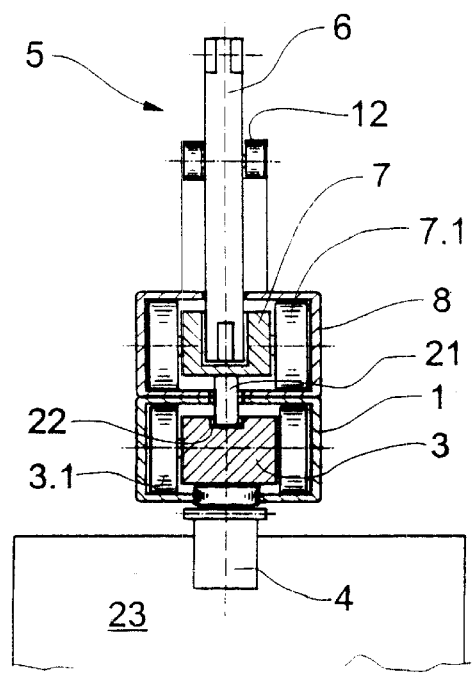

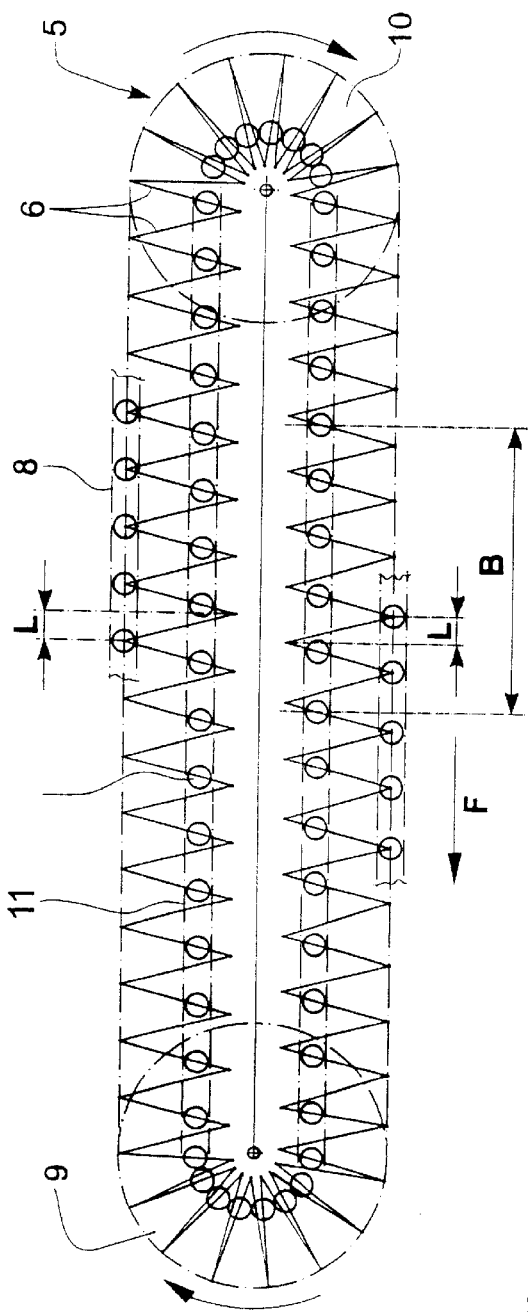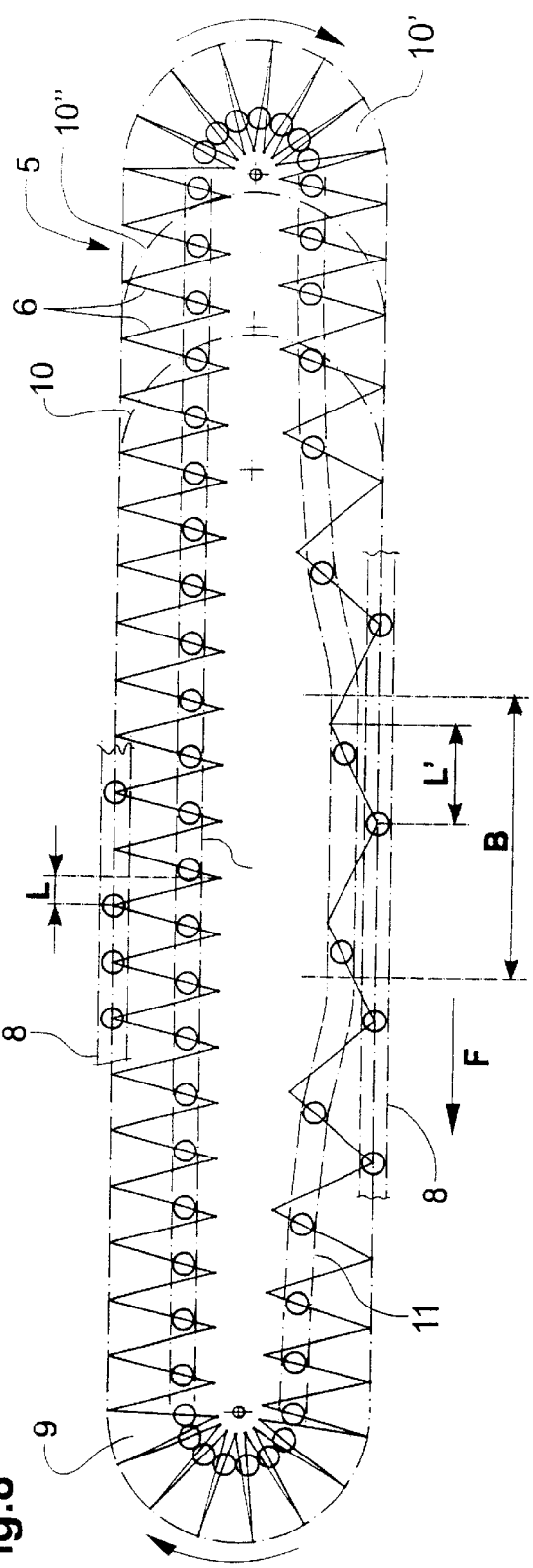

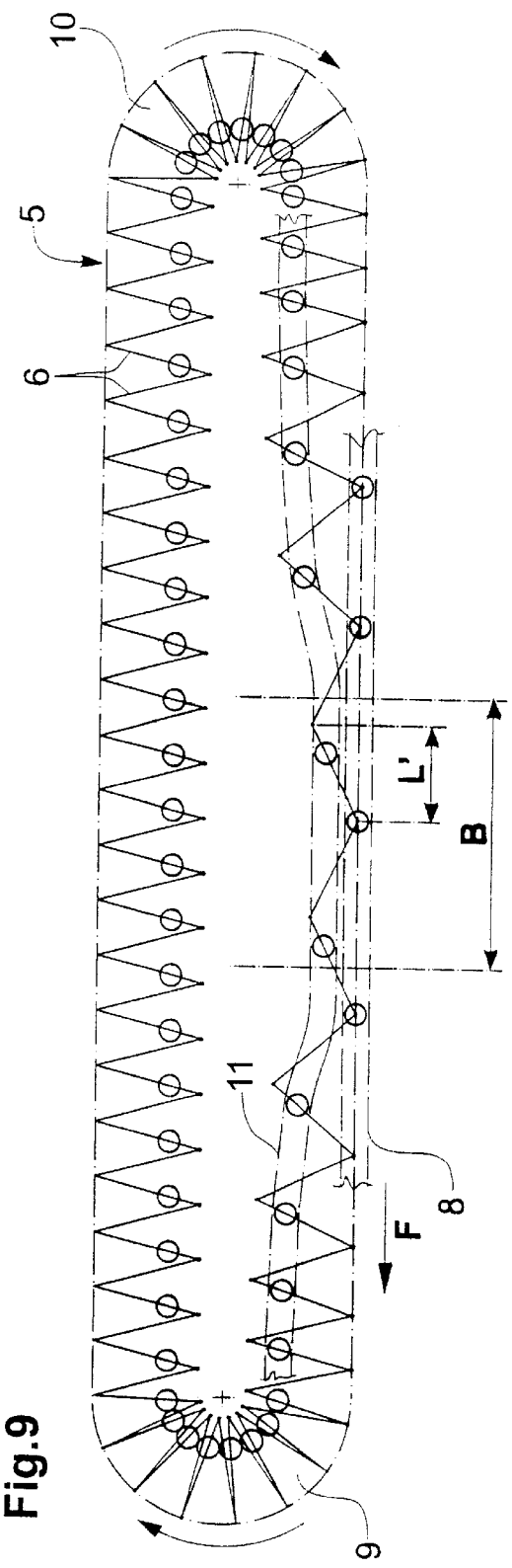
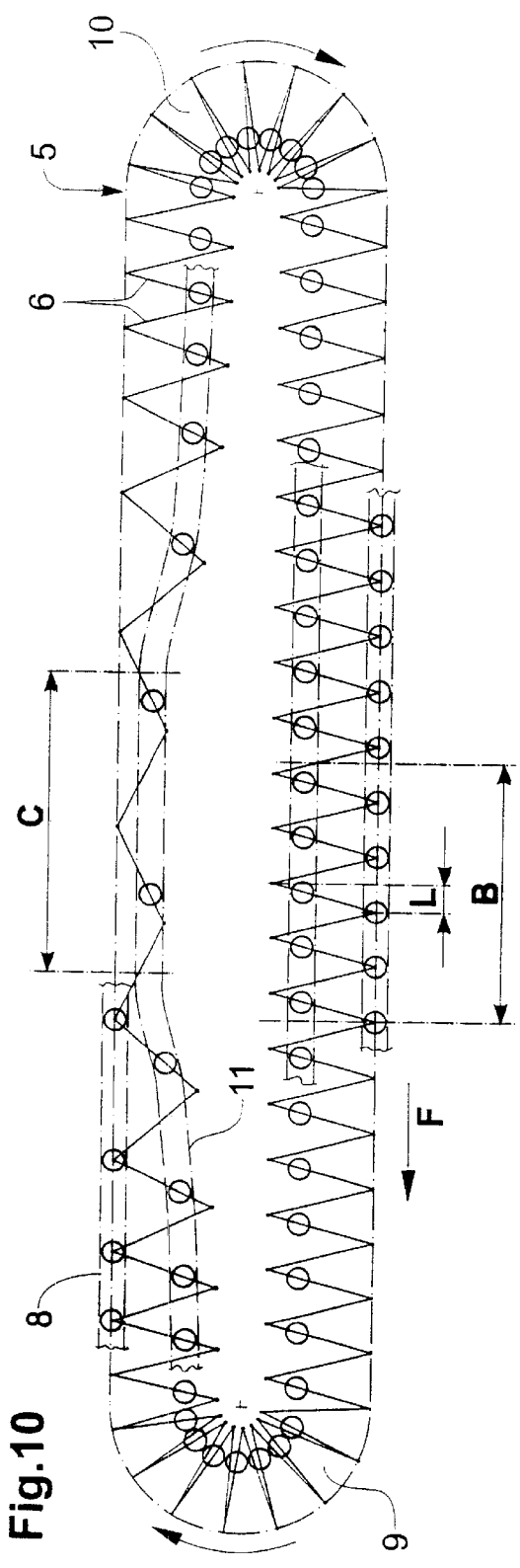
Fig.9
Fig.10

CONVEYING DEVICE

The invention is situated in the field of materials handling technology and concerns a conveying device in accordance with the generic term of the independent claim. The device serves to convey piece goods, i.e., to convey a large number of identical or at least similar objects on a conveyor track, for example to a processing point, through the processing point and away from the processing point. The objects are for example printed products. During conveyance they are held individually or in small groups in a defined position.

For gripped conveyance printed products are usually freely hanging, being individually held in the region of an upper edge oriented substantially transverse to the conveying direction. The advantage of such conveyance consists in the fact, that each product has its own individual place within the conveyed stream, that the products therefore at any time can be individualized, that nonetheless, however, the product spacings can be small relative to the product size, which already in the case of relatively low conveying speeds renders high conveying capacities possible.

If printed products, which are conveyed in such a dense conveyed stream, need to be processed during conveyance, it is in many cases necessary to not only change their relative position temporarily, but if so required also to increase the spacings between the printed products at least temporarily, so that the individual printed products are sufficiently accessible for processing.

Conveying devices for the named conveying tasks, for example comprise a plurality of holding elements, which are driven in circulation on a closed-in-itself track more or less independently of one another, wherein a part of this track is utilized as conveyor track and the remainder of the track is used for returning the holding elements from the end of the conveyor track to its beginning. Each of the holding elements has a body movable along a rail in a rolling or sliding manner and a gripper mounted on the body. The grippers are closed in a controlled manner on taking over an object and are opened in a controlled manner on releasing the object. The movable rolling or sliding bodies are advantageously designed in such a manner, that they can be driven closely adjacent to one another, for example by pushing, and that in such pushed operation there are precisely defined, regular minimum spacings between the grippers, resp., between the objects held by the grippers. A conveying device of this type is, for example, described in the publication WO-99/33733.

If in a conveying device of the type described above not only precisely defined minimum spacings, but at least in certain zones also precisely defined other spacings larger than the minimum spacings, are to be established, then the device needs to comprise means for establishing the desired spacings and a corresponding conveying speed as well as means for maintaining during conveyance the desired established spacings and speed. A conveyor system comprising such means is e.g. described in the publication U.S. Pat. No. 5,261,520 (Duke). The system described comprises holding elements which are independent of one another and which are moved by four different driving organs along a closed-in-itself track. On a first part of the track, a first endless driving organ with a first conveying speed and with conveying cams defining a first holding element spacing is active, on a second part of the track a second endless driving organ with a second conveying speed differing from the first one and with conveying cams defining a second holding element spacing different from the first one is active. Between the two parts of the track there is in each case a screw drive having a screw pitch getting larger, resp., smaller in the conveying direction, which screw drives bring the holding elements from one spacing to the other, i.e., phase or time them from the one type of conveyance to the other. Such a conveying device can be expanded to as many zones with different holding element spacings as required, wherein for every zone with a certain holding element spacing a driving organ and between every two zones of this kind always a means for phasing or adjusting have to be provided.

Conveying systems with grippers installed on a circulating traction organ can also be equipped for a gripper spacing change in specific zones. In the publication EP-0300170, a device of this type is described. The traction organ is a chain comprising a plurality of chain links being joined together in an articulated manner by hinge pins. The hinge pins are equipped with guide rollers, with which they are alternately guided in two guideways in such a manner, that the distance between the two guideways determines the angles between the links and therefore also the length of the links in conveying direction and the spacing between adjacent grippers installed on every fourth hinge pin. In zones of the conveyor track, in which the holding means are to have greatest possible spacings, the guideways are arranged in such a way (smallest possible distance between the guideways), that the chain is substantially stretched out. In such conveyor track zones, in which the holding means are to have the smallest possible spacings, the guideways are arranged in such a manner (greatest possible distance between the guideways), that the chain is compressed to a maximum degree.

The object of the invention is to create a conveying device for conveying piece goods. The conveying device comprises in per se known manner a rail track and holding elements with grippers being movable substantially independently of one another along the track, the holding elements being designed in such a manner, that in pushed operation a uniform, minimum spacing between the grippers is established. In at least one zone of the track (adjustment zone) the gripper spacing is to be larger than the minimum spacing in a precisely defined way. The inventive device shall be simpler than corresponding devices according to prior art and shall be utilizable with as few limitations as possible. Furthermore, the inventive device shall make it possible, also in a simple manner, to within an adjustment zone choose one specific spacing increase from a plurality of possible spacing increases and/or to optionally activate or de-activate the spacing increase.

This objective is achieved by the conveying device as defined by the independent claim. The dependent claims define preferred embodiments of the inventive conveying device.

The inventive conveying device comprises a rail track and holding elements movable along the rail track independently of one another. The inventive conveying device further comprises at least one drive for conveying the holding elements tightly ranged together towards an adjustment zone and advantageously again tightly ranged together away from the adjustment zone, wherein gravity can possibly be exploited as driving means. Furthermore, the device comprises in the adjustment zone a means for increasing the spacings between the holding elements in a controlled manner. This means is an endless circulating, compressible adjusting chain, which is adapted to the holding elements and which is arranged in such a manner, that a part of its circulating track runs parallel to the rail track and the chain is in engagement with holding elements on the rail track.

Cooperating with the adjusting chain there is a means for defining the local compression of the adjusting chain in this part of the circulating track such that chain compression in the area of the adjustment zone is decreased from a value corresponding to the minimum spacing of the holding elements to a value corresponding to a predetermined larger holding element spacing.

The holding elements conveyed with minimum spacings enter into engagement with the adjusting chain, which at the point of engagement is compressed in correspondence with the minimum spacing. While the holding elements are conveyed onwards in engagement with the adjusting chain, the compression decreases, i.e., the adjusting chain is expanded, so that the holding elements are pushed apart. In passing through the adjustment zone, the degree of compression corresponds to the predefined, increased holding element spacing and is maintained constant. After the adjustment zone, the degree of compression of the adjusting chain increases again, until it once again corresponds to the minimum spacing of the holding elements. Thereupon, the holding elements are released from engagement with the adjusting chain.

While holding elements and adjusting chain are in engagement with one another, the adjusting chain is driven, for example, by the holding elements (for example, pushed). It goes without saying, that it is also possible to drive the holding elements through the adjusting chain. It is furthermore possible, to drive both chain and holding elements, obviously with the same speed.

The compressible adjusting chain has e.g. links joined together in an articulated manner and being designed in such a way, that the chain can be compressed like a concertina. The means for adjusting the chain compression are e.g. control rollers located on the chain links or on the link joints and rolling alternately on two stationary cams or guideways, wherein the distance between the cams defines the chain compression.

For allowing selective adjustment of a plurality of different holding element spacings larger than the minimum spacing, the means for adjusting compression of the adjusting chain have to be designed to be adjustable and furthermore, means for compensating a change in the length of the adjusting chain must be provided, the change in chain length being caused by a local change in chain compression. For a selectable activation/de-activation of the spacing increase, either similar compensating means as for selective adjustment can be utilized or the adjusting chain can be arranged to be displaceable in such a manner, that the engagement with the holding elements is selectively activated or de-activated.

Exemplary embodiments and applications of the inventive conveying device are described in detail in connection with the following Figures, wherein:

FIGS. 2 and 3 show holding elements and adjusting chain of the embodiment in accordance with FIG. 1 (FIG. 2: section parallel to the direction of conveyance; FIG. 3: section transverse to the direction of conveyance);

FIG. 5: section transverse to the direction of conveyance);

FIGS. 7 and 8 show an adjusting chain with compensating means (FIG. 7: without compression reduction in the adjustment zone; FIG. 8: with compression reduction in the adjustment zone);

FIGS. 9 and 10 show a further adjusting chain with compensating means (FIG. 9: with compression reduction in the adjustment zone; FIG. 10: without compression reduction in the adjustment zone);

Figure 1:
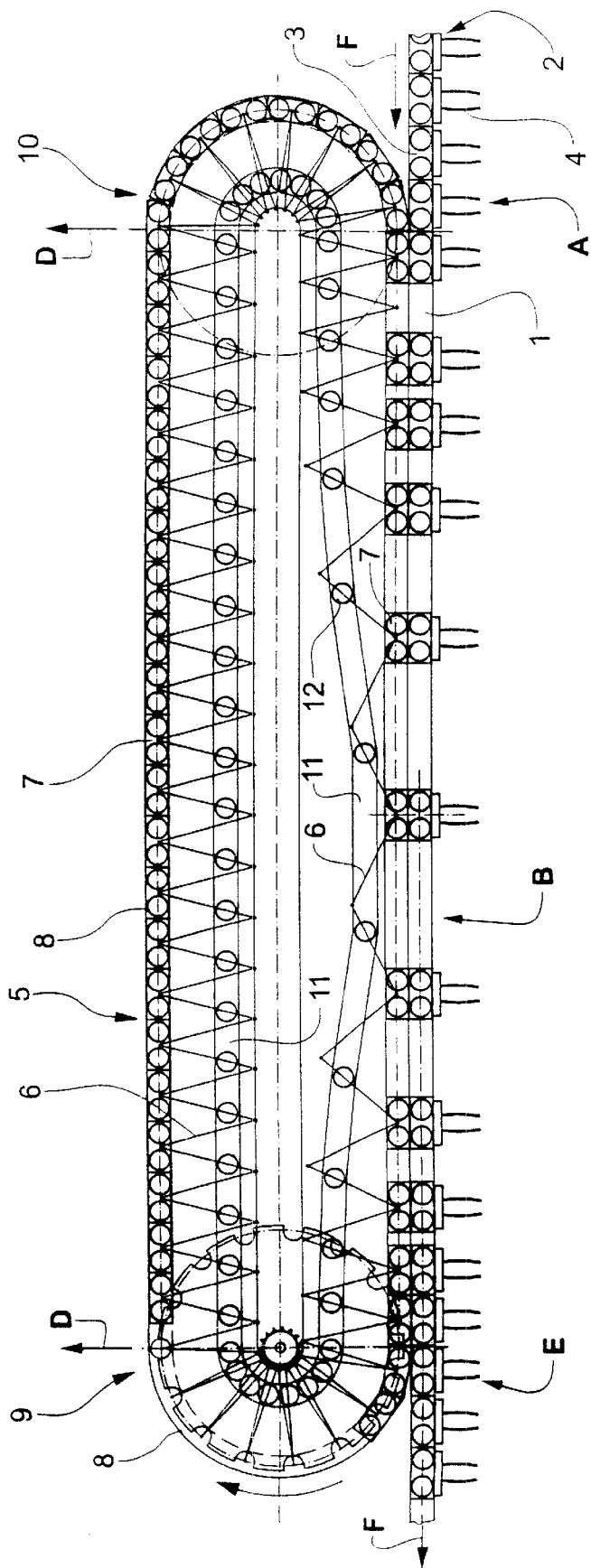
FIG. 1 shows an exemplary embodiment of the device in accordance with the invention.

FIG. 1 illustrates the adjusting zone of an exemplary embodiment of the inventive device. The device comprises a rail track 1 and holding elements 2 movable along the rail track 1 in a conveying direction F, each holding element 2 having a roller body 3 and a gripper 4 mounted on the roller body 3. The holding elements 2 are conveyed by a suitable drive (not depicted), for example, by pushing one another, i.e., with minimum spacing between one another.

Furthermore, the device comprises an endless circulating and compressible adjusting chain 5, which consists of a multitude of chain links 6 joined together in an articulated manner. Arranged on every second, articulated link joint, there is a chain roller body 7, which is of a similar design as the roller bodies 3 of the holding elements 2. The chain roller bodies 7 run in a circular guideway 8, which together with two chain wheels 9 and 10 define the endless track of the adjusting chain 5. At least one part of this track runs parallel to the rail track 1, along which the holding elements 2 are movable. This part encompasses the adjustment zone B.

The degree to which the adjusting chain 5 is compressed is defined by a cam 11 being less distanced from the circular guideway 8 of the chain bodies 7 in the adjustment zone than in the other zones of the circular track of the chain 5. Control rollers 12 arranged on chain link joints alternating with roller body 7 carrying joints roll along cam 11.

In preference, the adjusting chain 5 and the means (11, 12) defining its degree of compression are designed in such a manner, that the chain 5 is at maximum compression on its circulating track and that the compression is only reduced in the adjustment zone B. The maximum compression, for example, can be defined by the chain roller bodies 7 of the adjusting chain 5, which in the case of maximum compression are ranged tightly together, as is illustrated in FIG. 1 in the upper part of the circulating track of the adjusting chain. If the adjusting chain 5 is operated by being pushed, it automatically assumes the condition of maximum compression, so that in corresponding zones of its circulating track the cam 11 can be absent.

As is still to be shown in detail in connection with FIGS. 2 and 3, the holding elements 2 and the adjusting chain 5 come into engagement with one another at an engagement point A and remain in engagement with one another up to a release point E, where the circulating track of the adjusting chain 5 and the rail track 1 separate and engagement is released. Between the engagement point A and the release point E, the circulating track 8 and the rail track 1 run parallel to one another. Between A and E is the adjustment zone, i.e., the zone, in which the adjusting chain 5 is held expanded by means of cam 11 and the holding elements 2 are in engagement with the adjusting chain 5. Beyond the release point E, the holding elements 2 are driven away by a suitable drive (not depicted), once again, for example, with a minimum spacing between one another.

It is possible to drive the adjusting chain 5 and therewith also the holding elements 2 between the engagement point A and the release point E through the deflection wheel 9. The drive for conveying the holding elements to the engagement point A and away from the release point E in this case, for example, can be taken over by gravity, if the rail track in these zones is designed correspondingly sloping downward in conveying direction. Advantageously, the holding elements 2 are pushed through the adjustment zone B and beyond release point E by further holding elements suitably driven further upstream. The pushed holding elements push along with them the adjusting chain 5, which in this case circulates e.g. passively. It is also possible to push the holding elements 2 and also to drive the adjusting chain 5, wherein the two drive speeds have to be accurately matched to one another.

If in a device as illustrated in FIG. 1, the spacing increase is to be de-activatable, then the circulation track of the adjusting chain 5 is e.g. displaceable transverse to the conveying direction such that for de-activation it can be distanced from the rail track 1 (arrows D). If the adjusting chain 5 is positioned in this distanced position, then engagement of the chain 5 with the holding elements 2 is no longer possible and the holding elements 2 are pushed through the adjustment zone with unchanged, minimum spacings.

FIGS. 2 and 3 show in a larger scale adjusting chain 5 and holding elements 2 of the inventive device as shown in FIG. 1 and being in engagement with one another. FIG. 2 depicts the device in section parallel to the conveying direction F. The point illustrated is located downstream of the engagement point where the adjusting chain 5 and holding elements 2 are in engagement with one another, and immediately before the adjustment zone B, i.e., at the point, where the spreading out of the adjusting chain 5 begins. Identical parts are designated with the same reference numbers as in FIG. 1.

Every second articulated link joint of the adjusting chain carries a chain roller body 7 equipped with a group of guide rollers 7.1. The chain roller bodies 7 further have a driver 21 each. The guide rollers 7.1 run in the circular guideway 8, which in this zone runs parallel to the rail track 1 and immediately adjacent to it, in such a manner, that the drivers 21 engage in corresponding recesses 22 of the holding elements 2.

Drivers 21 and recesses 22 can also be transposed or can be replaced with other cooperating driving means.

The roller bodies 3 of the holding elements 2 carrying the grippers 4 gripping the objects 23 are guided along the rail track 1 in conveying direction F by means of guide rollers 3.1. They preferably have a length corresponding to the length of the chain roller bodies 7. This means that chain roller bodies 7 and roller bodies 3 of the holding elements 2 have the same minimum spacings and can therefore be easily synchronized at the engagement point A.

As already indicated in connection with FIG. 1, for the spread-out condition of the adjusting chain 5 (on the left in FIG. 2) a guideway or cam 11 for the control rollers 12 is needed for defining compression of chain 5. Where the chain is being driven by pushing and maximum compression is needed, the cam 11 is not necessary as chain compression is limited by the length of the chain roller bodies 3 in conveying direction F (maximum degree of compression, on the right in FIG. 2).

Figure 4:
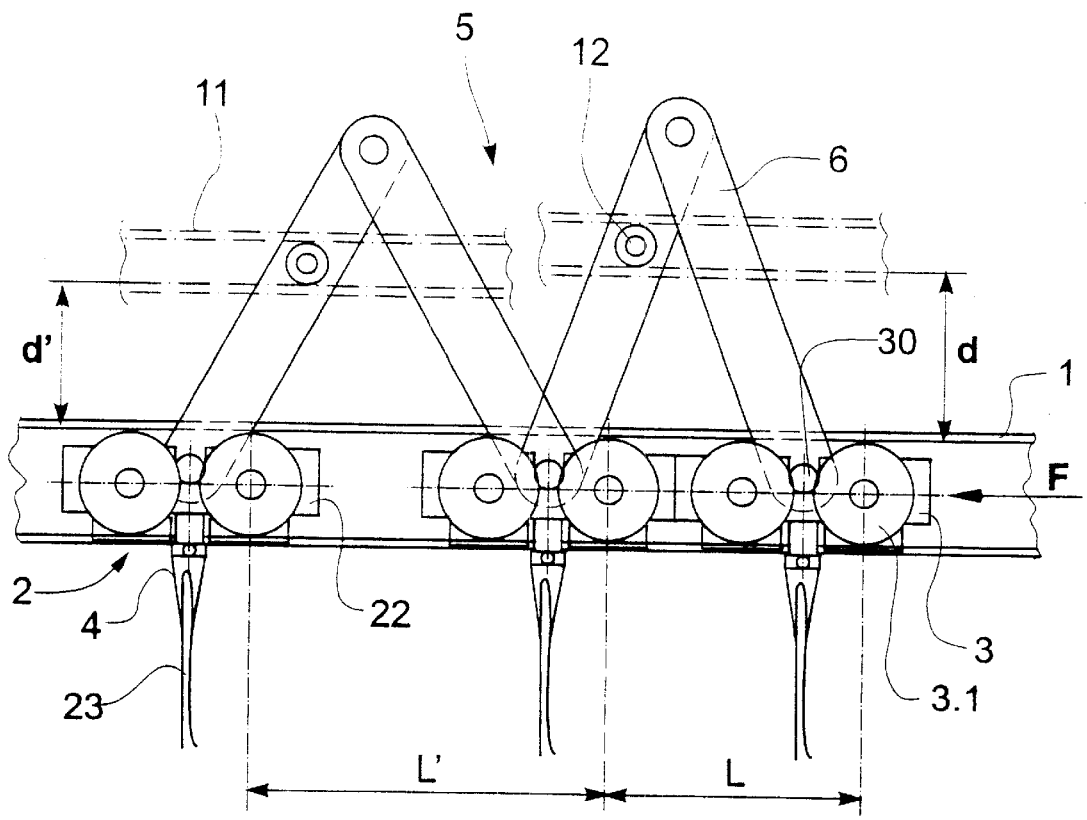
FIGS. 4 and 5 show holding elements and adjusting chain of a further, exemplary embodiment of the device in accordance with the invention (FIG. 4: section parallel to the direction of conveyance.
Figure 5:
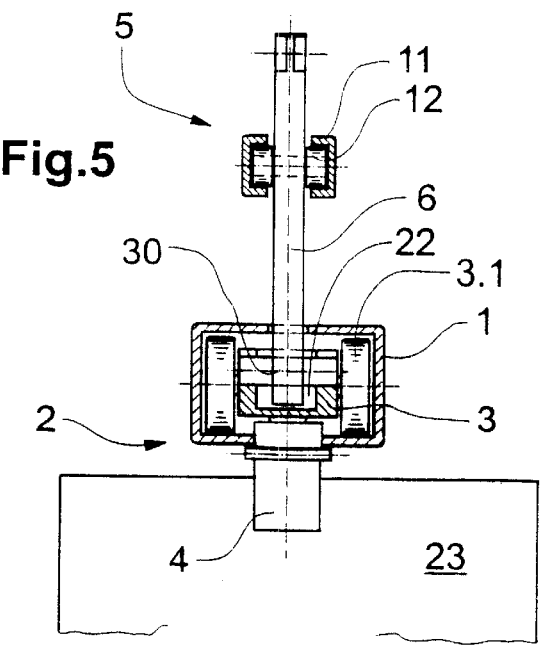

FIGS. 4 and 5 illustrate a further, exemplary embodiment of the adjusting chain 5, which is in engagement with holding elements 2. The mode of depiction is the same as in FIGS. 2 and 3. The adjusting chain in this case has no circular guideway and no chain roller bodies with drivers, but it is rather the hinge pins 30 of every second joint between chain links 6, which engage in corresponding recesses 22 of the roller bodies 3 of the holding elements 2. This means that the rail track 1 locally takes over the function of the circular guideway.

From FIG. 4 it is clearly evident, how the distance d, resp., d' between the cam 11 and the rail track 1 determines the spacings L, resp., L' between the holding elements 2, which in essence correspond to the spacings between flat objects 23, which are conveyed held by the grippers 4. The distance d between cam 11 and rail track 1 defines the smallest possible holding element spacing L (highest possible degree of compression of the adjusting chain) and the distance d' the increased spacing L' to be adjusted.

While in the embodiment in accordance with FIGS. 2 and 3 for pushed operation and maximum compression, the cam 11 can be made do without, for the embodiment in accordance with FIGS. 4 and 5 cam 11 is necessary at least in the area of the engagement point A, in order to give the hinge pins 30 engaging in the holding elements 2 a distance matched to that of the holding elements 2. In zones, in which the adjusting chain 5 is in engagement with the holding elements 2 and in which the spacing between the holding elements is to be a minimum, the cam 11 can again be made do without, because (presupposing operation by pushing) the roller bodies 3 of the holding elements 2 determine the degree of compression.

Figure 6:
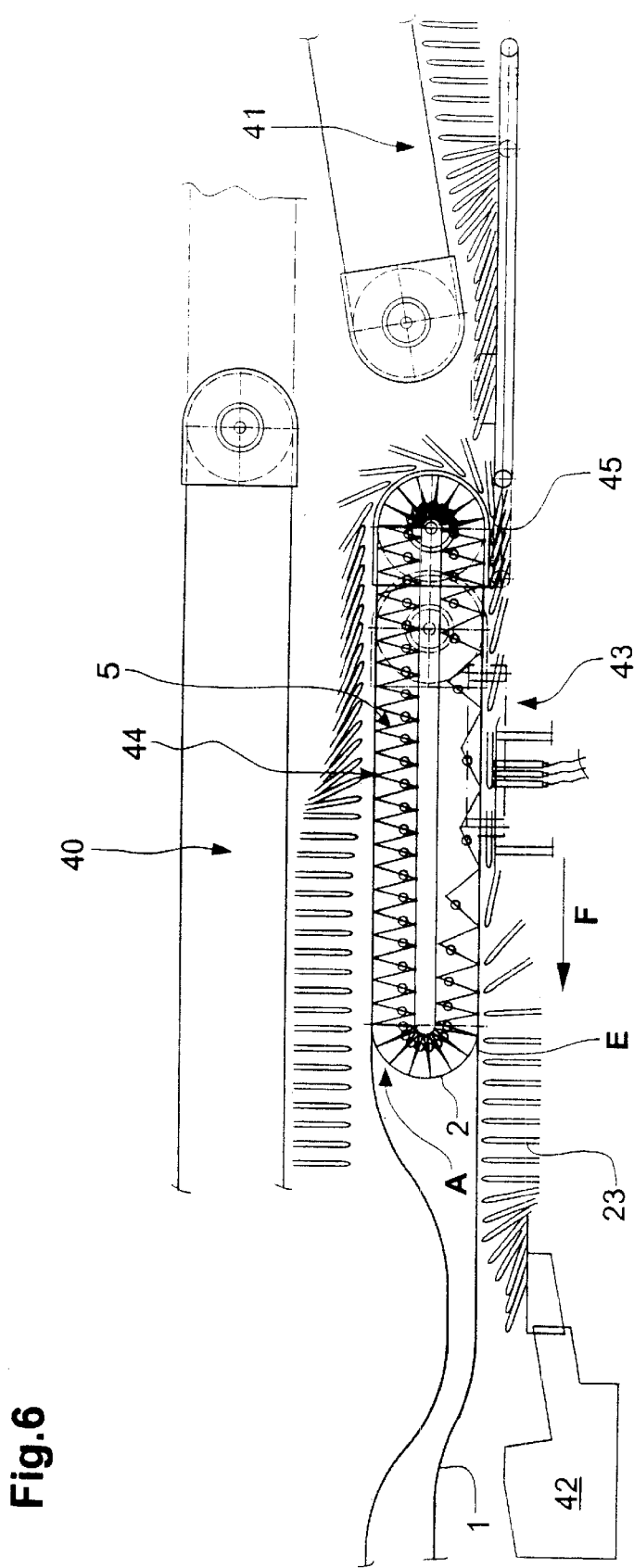
FIG. 6 shows an exemplary application for an inventive device according to FIG. 1 to 3 or 4 to 5.

FIG. 6 illustrates an exemplary application of the inventive device as described in connection with FIGS. 1 to 5. This application concerns a system for conveying printed products being supplied selectively by two feeding systems 40 and 41 (e.g., conveying systems with gripper chains), for example, to a packaging device 42, wherein an individual processing operation 43 (for example, an addressing operation) is optionally switched in between feeders 40 or 41 and packaging device 42. When the processing operation is switched in, the product spacings are increased to accommodate it. If so required for different product formats different increased spacings are adjusted. In the case of the processing operation not being switched in, it is advantageous to leave the product spacings at the minimum (no increase of spacing), to such an effect, that the conveying speed does not have to be increased.

The depicted inventive conveying device in essence corresponds to the device according to FIG. 1, wherein, however, for de-activating the spacing increase other means are provided (refer to FIGS. 7 and 8).

The holding elements (not depicted), which are displaceable along the rail track 1, come into engagement with the adjusting chain 5 at the engagement point A. They take over printed products either from the feeder system 40 at a first take-over point 44 or from the feeder system 41 at a second take-over point 45. If an individual processing operation is to take place, they are set to increased spacings. Following the individual processing operation they are released from the engagement at the release point E. If the individual processing operation is not to take place, then the spacing adjustment is de-activated by avoiding an engagement between holding elements and adjusting chain, as has been described, e.g., in connection with the FIG. 1, or the adjusting chain 5 is not spread in the adjusting zone (refer to the following figures).

FIGS. 7 to 11 illustrate different methods, by means of which the holding element spacing in the adjustment zone of an inventive device can be selectively adjusted depending on the actual application in question or else the spacing increase can be selectively activated and de-activated. According to these Figures, unlike as described in connection with FIG. 1, the engagement between holding elements and adjusting chain is not selectively prevented by displacement of the circulating track of the adjusting chain, but the desired adjustment is achieved by the adjusting the compression of the adjusting chain correspondingly, resp., by selectively not spreading it at all. Each one of the Figures very schematically illustrates an adjustment chain 5, which circulates in a closed-in-itself circulating track, whereby the adjusting chain 5 within an adjustment zone B is compressible, resp., spreadable in a controlled manner, as has been described in connection with FIGS. 1 to 5. A selective spreading out of the adjusting chain, however, is only possible, if the different chain lengths due to different spreadings are compensated in other zones or else the circulating track of the chain is correspondingly changed.

FIGS. 7 to 11 show adjusting chains 5, the circulating track of which is defined by two chain wheels 9 and 10 each, wherein the chain wheels rotate passively or if so required are driven and are in engagement with every second articulated joint between chain links 6. Between the chain wheels 9 and 10, the circulating track of the adjusting chain is in essence straight. This most simple shape of the circulating track of an adjusting chain as illustrated in the FIGS. 7 to 11 in no way represents a limitation for the invention The circulating track of the adjusting chain 5 of the inventive device can be of any length and it can be defined by a larger or smaller number of deflection or drive wheels. Furthermore, it can also run differently than in a straight line between deflection or drive wheels by means of correspondingly differently arranged guideways 8.

The lower track zone in FIGS. 7 to 11 contains the adjustment zone B, therefore is the section, on which the adjusting chain is in engagement with holding elements, which are not depicted.

FIGS. 7 and 8 show an adjusting chain 5 with a compensatory track length adaptation. FIG. 7 depicts the adjusting chain 5 in a first adjustment condition, FIG. 8 in a second adjustment condition. In the first condition the length L of the chain links projected onto the conveying direction, resp., the spacing between holding elements in engagement with the chain are the same on the whole circulating track (including the adjustment zone B) and, for example, correspond to the greatest possible degree of compression. In the second adjustment condition the projected link lengths are unchanged L except within the adjustment zone B, where a greater projected link length L' is adjusted.

Serving as control means for changing the adjustment condition is the guideway or cam 11, which in the first adjustment condition (FIG. 7) runs parallel to the circulating guideway 8 (or if applicable to a rail track 1, refer to FIGS. 4 and 5), in the second adjustment condition, however, the corresponding distance becomes smaller in the adjustment zone B than in the remaining track zones. The cam 11 therefore has to be designed as an adjustable control means in the adjustment zone B and in the immediately adjacent zones, i.e., has to be designed correspondingly displaceable or interchangeable.

The change of the overall length of the adjusting chain 5 caused by a transition from one adjustment condition to the other one which length change results from the change in chain compression in the adjustment zone B is compensated by a corresponding change (elongation or shortening) of the circulating track, for example, by displacing one of the chain wheels 10 into a position designated with 10' and if so required by means of a corresponding elongation of the circular guideway 8 and of the cam 11.

When changing from one adjustment condition to the other one, the number of links 6 between the chain wheels 9 and 10 is to be adapted also (FIG. 7: the same number of chain links on the upper and on the lower part of the track; FIG. 8: more chain links on the upper part of the track than on the lower part of the track). This adaptation takes place automatically, if at least one of the chain wheels is a passively rotating deflection wheel or is made passively rotating at least for the changeover.

The control means and the compensating means, as provided in the device according to FIGS. 7 and 8, make a plurality of adjustment conditions (chain wheel positions 10, 10' and 10" indicated with a dot-dash line in FIG. 8) possible. With a cam 11 being deformable in a correspondingly controlled way in the adjustment zone B, stepless adjustment during operation is also conceivable.

FIGS. 9 and 10 show in the same, schematic mode of illustration as FIGS. 7 and 8 again two adjustment conditions of an adjusting chain 5, which adjustment conditions differ by the projected link lengths L and L' in the adjustment zone B or the chain compression respectively. In this case, the change in chain compression, resp., the change in chain length, which is caused by the transition from one adjustment condition to the other one, is compensated by means of a corresponding change of chain compression in a further track zone C (compensation zone), for example, as illustrated in FIG. 10, in the upper track zone. For this case, therefore the control means and the compensating means are in essence the same and act in the opposite sense. FIGS. 9 and 10 depict control means and compensating means in the form of changeable or interchangeable parts of cam 11, as also depicted in the FIGS. 7 and 8 as control means.

Figure 11:
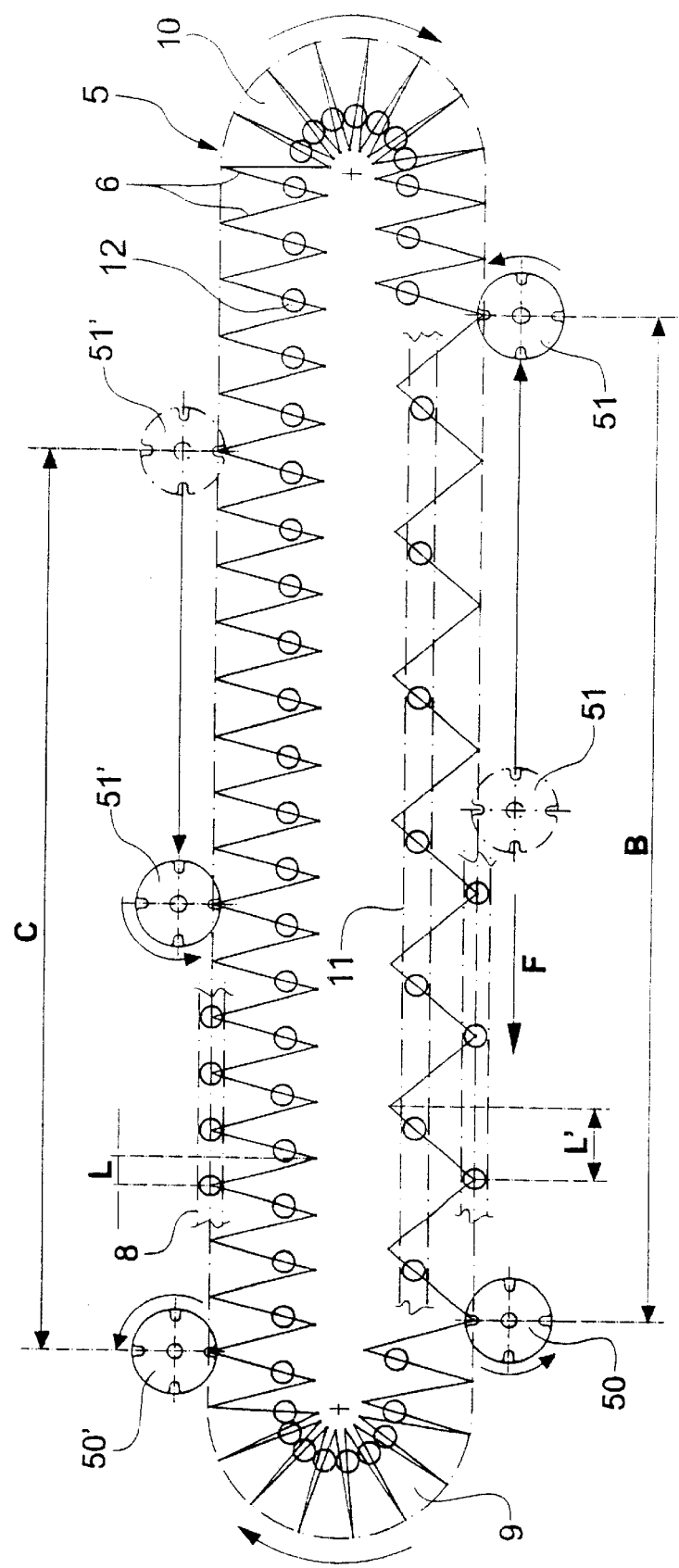
FIG. 11 shows a further adjustment chain with compensating means.

FIG. 11 shows in the same, schematic mode of illustration as FIGS. 7 to 10 a further embodiment of control means and compensating means for adjusting chain 5 and for compensating the change in chain compression due to the adjustment. The adjustment chain 5, again has an adjustment zone B, in which the chain compression is adjustable, and a compensation zone C, in which the adjustment of the adjustment zone B is compensated by a further change in chain compression. The control means and compensating means provided are a pair each of driven control wheels 50 and 51 for the adjustment zone B and 50' and 51' for the compensation zone C. The control wheels are in engagement with the adjusting chain 5, for example, at the articulated joints of the chain links 6, which run in the circular guideway 8. The first control wheels 50 and 50' of the two control wheel pairs are arranged positionally fixed and each one defines an end of the two zones B and C. The two second control wheels 51 and 51' are arranged displaceable along the circulating track. The two second control wheels 51 and 51' are illustrated with an unbroken line in one position and with a dot-dash line in a second position. The unbroken line position corresponds to the depicted situation, in which the link lengths are adjusted to the length L' in the adjustment zone B, while on the remainder of the track it corresponds to the minimum length L. The position of the control wheels 51 and 51' depicted with a dot-dash line corresponds to a situation, in which the link lengths are adjusted to the length L within the adjustment zone B and the link lengths are correspondingly elongated in the compensation zone C.

If the two control wheels 51 and 51' are displaced in the direction of the arrow from the position depicted with a dot-dash line to the position depicted with an unbroken line, the link length in the adjustment zone B is changed from L to L'. It is evident, that an infinite number of intermediate positions are possible, with which link lengths between L and L' are continuously adjustable.

If the two zones B and C are immediately adjacent to one another, then a single second control wheel is sufficient, which can take over the functions of the displaceable control wheels 51 and 51'. The rotation speed of the control wheels 50, 50', 51 and 51' is adapted to a superimposed drive speed of the adjusting chain 5, for example to the drive speed of the chain wheel 9 serving as the drive wheel. The drive wheel 9 can also take over the function of the first control wheels 50 and/or 50'. In this case, the zones B and C extend to this chain wheel 9. The chain wheel 10 is a passive guiding or deflection wheel or is at least switchable to a passively rotating condition for the changeover from one adjustment condition to another one. The chain wheel 10 may also be absent.

The cam 11 within the compensation zone B serves to equalize the link spacings. The corresponding piece of cam 11 is preferably releasable and in a released state, displaceable in a controlled manner. During a changeover, the piece of cam is released and automatically displaced by the guide rollers 12. If the uniformity of the link lengths in the adjustment zone B is not important and the adjusting chain 5 is correspondingly driven, then guidance of the control rollers 12 by cam 11 can be made do without. The same is applicable for the compensation zone C.

For compensation by changing the chain compression in a compensation zone C it is not a condition, that the zones B and C are of the same length and that the changes to the chain compression is inversely equal, as is depicted in the FIGS. 9 to 11.

In FIGS. 7 to 11, one control means each for adjusting a predetermined compression of the adjusting chain 5 within the adjustment zone B and one compensating means for compensating the change in chain length caused by the compression change are depicted. The pairing of control means and compensation means as illustrated by the Figures is in no way binding. Therefore, it is e.g. conceivable to combine one pair of control wheels serving as control means, as illustrated in FIG. 11, with a means for lengthening the circulating track (FIGS. 7 and 8) serving as compensating means.

What is claimed is:

1. Conveying device for gripped conveyance of individual objects (23) in a conveying direction (F), which conveying device comprises a rail track (1) and a plurality of holding elements (2) being movable substantially independently of one another along the rail track, wherein the holding elements (2) are designed in such a manner, that in pushed operation they have a defined minimum spacing between one another, characterized in that the device further comprises an adjusting chain (5) which is circulating along a circulating track and whose compression is variable, wherein, at least within an adjustment zone (B), the circulating track of the adjusting chain (5) runs parallel to the rail track (1) and the adjusting chain (5) is in engagement with holding elements (2) conveyed along the rail track (1) and that within the adjustment zone (B) a control means for locally reducing the compression of the adjusting chain (5) is provided.

2. Conveying device according to claim 1, characterized in that the adjustment chain (5) comprises chain links (6) connected to one another in an articulated manner, wherein guide rollers (7.1) or guide roller groups and control rollers (12) are alternatingly assigned to the articulated joints of the chain links (6) and for controlling compression of the adjustment chain (5) at least through the adjustment zone, the guide rollers (7.1) are guided along a circular guideway (8) and the control rollers (12) along a cam (11), and that driving means parts for driving the holding elements (2) are located on the articulated joints guided along the circular guideway (8).

3. Conveying device according to claim 1, characterized in that the adjusting chain (5) comprises chain links (6) connected to one another in an articulated manner, a hinge pin (30) each arranged on every second articulated joint of chain links (6) and control rollers (12) assigned to the other articulated joints, wherein for controlling compression of the adjusting chain (5) at least through the adjustment zone (B) the hinge pins (30) are in engagement with the holding elements (2) and the control rollers (12) are guided along a cam (11).

4. Conveying device according to one of claims 1 to 3, characterized in that the control means are designed in such a way, that compression of the adjusting chain (5) upstream and downstream of the adjustment zone (B) corresponds to the minimum spacing of the holding elements (2).

5. Conveying device according to claim 4, characterized in that the adjusting chain (5) circulates passively and that driving means are provided for conveying the holding elements (2) in a pushed manner through the adjustment zone (B).

6. Conveying device according to claim 4, characterized in that the adjusting chain (5) is driven and that the rail track (1) is sloping downwards upstream and downstream of the adjustment zone (B) in such a manner , that the holding elements (2) are driven by the force of gravity.

7. Conveying device according to claim 1, characterized in that the control means for reducing compression of the adjusting chain (5) is designed for a sole, predefined compression.

8. Conveying device according to claim 7, characterized in that for activating and de-activating engagement with the holding elements (2), the circulating track of the adjusting chain (5) is displaceable substantially perpendicular to the conveying direction (F).

9. Conveying device according to claim 1, characterized in that the control means for reducing compression of the adjusting chain (5) is designed for a plurality of predefined degrees of compression and that the device further comprises compensating means for compensating a local change in length of the adjusting chain (5) in the adjustment zone (B) caused by the local change of chain compression.

10. Conveying device according to claim 9, characterized in that the compensating means comprises means for adapting the length of the circulation track of the adjusting chain (5).

11. Conveying device according to claim 10, characterized in that the compensating means comprises means for displacing a chain wheel (10) deflecting the adjusting chain (5).

12. Conveying device according to claim 9, characterized in that the compensating means comprises means for adapting compression of the adjusting chain (5) in a compensation zone (C) of the circulating track of the adjusting chain (5).

13. Conveying device according to claim 12, characterized in that for controlling and/or compensatory adaptation of the compression of the adjusting chain (5) the cam (11) in the adjustment zone and/or in the compensation zone (C) is displaceable, deformable or interchangeable.

14. Conveying device according to claim 12, characterized in that for controlling and/or compensatory adaptation of the compression of the adjusting chain (5) a pair of driven control wheels (50, 51, 50', 51') in engagement with the adjusting chain (5) is provided in the adjustment zone (B) and/or in the compensation zone (C), wherein in every pair one of the control wheels (50, 51) is arranged positionally fixed and the other one of the control wheels (51, 51') is displaceable along the circulating track of the adjusting chain (5).

15. Conveying device according to claim 14, characterized in that the function of the positionally fixed control wheel (50, 50') is taken over by a driven chain wheel (9) deflecting the adjusting chain (5).

16. Conveying device according to claim 13, characterized in that the adjustment zone (b) and the compensation zone (C) are located immediately adjacent to one another and that the function of the two displaceable control wheels (51, 51') is taken over by only one displaceable control wheel, which is located between the stationary control wheels (50, 50').

17. Use of a conveying device according to claim 1 for conveying printed products.

18. Use of a conveying device according to claim 1 for conveying and selectively processing printed products.

* * * * *

UNITED STATES PATENT AND TRADEMARK OFFICE
CERTIFICATE OF CORRECTION

PATENT NO. : 6,467,608 B2
DATED : October 22, 2002
INVENTOR(S) : H. Ulrich Stauber It is certified that error appears in the above-identified patent and that said Letters Patent is hereby corrected as shown below:

<u>Title page,</u>
Insert Item:
-- [30]  Foreign Application Priority Data
  January 18, 2000  (CH)  0 087/00 --.

Signed and Sealed this

Seventh Day of December, 2004

JON W. DUDAS
*Director of the United States Patent and Trademark Office*